March 28, 1967 R. G. BINVIGNAT 3,310,903
DISMOUNTABLE FISHING ROD
Filed Feb. 17, 1965 2 Sheets-Sheet 1
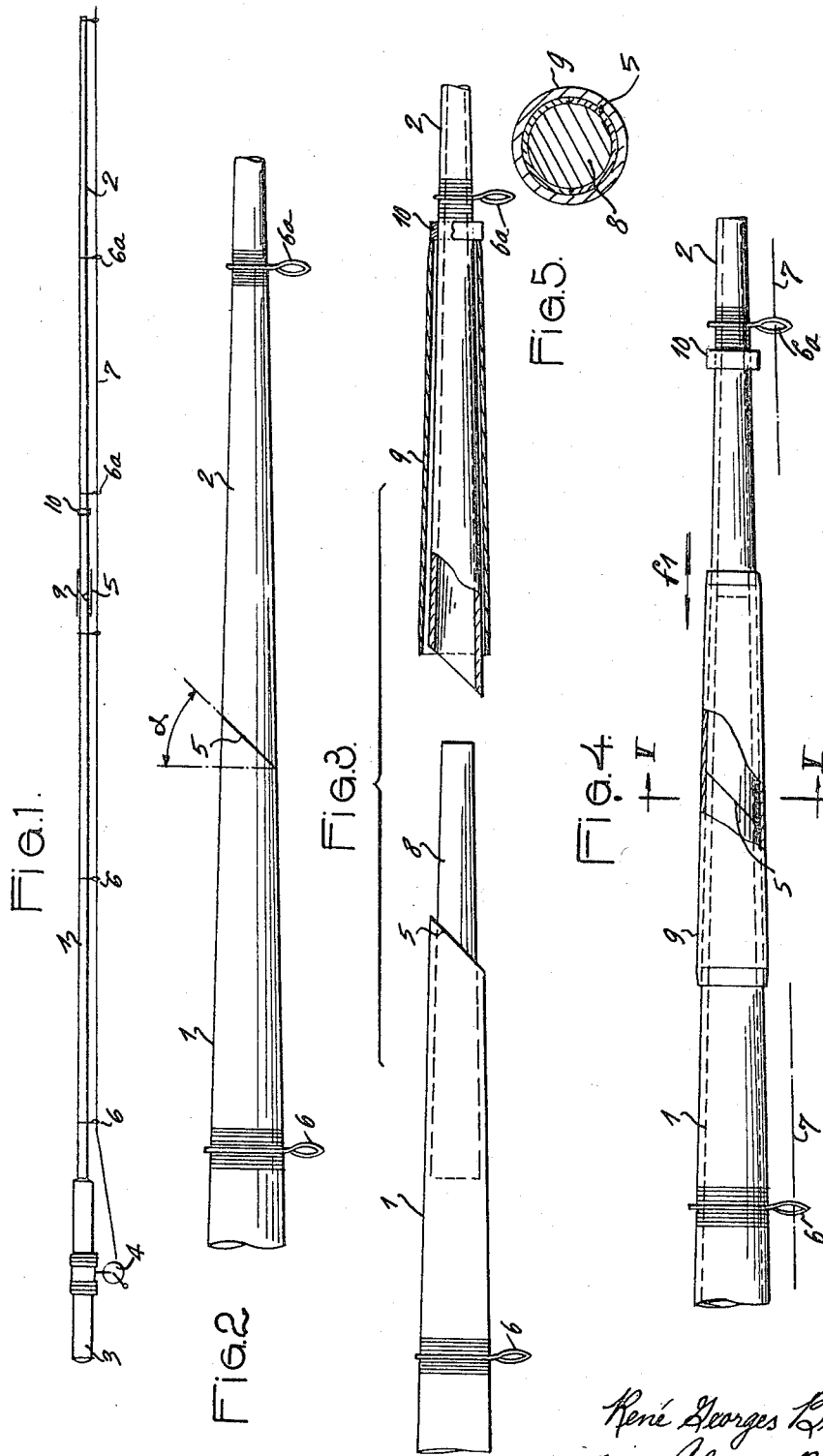
Inventor
René Georges Binvignat
By Alvin Browdy
Attorney March 28, 1967         R. G. BINVIGNAT         3,310,903
                    DISMOUNTABLE FISHING ROD
Filed Feb. 17, 1965                           2 Sheets-Sheet 2
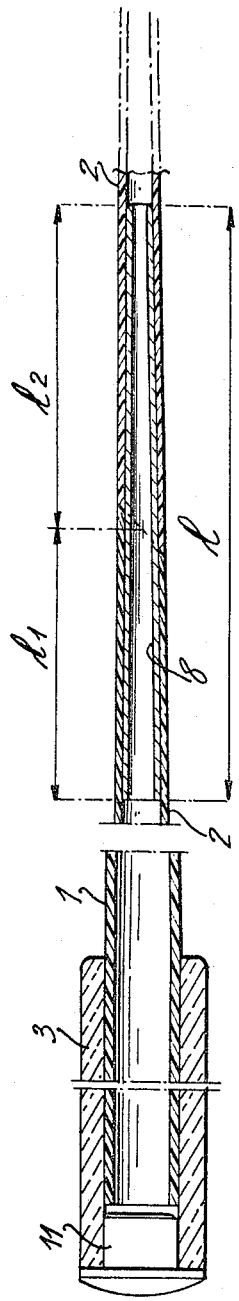
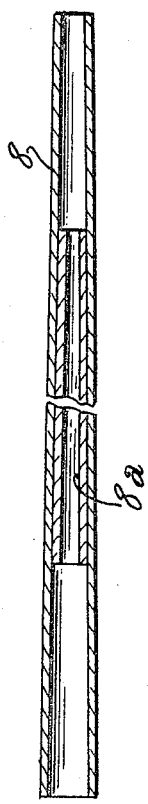
Inventor
Renè Georges Binvignat
By Alvin Browdy
Attorney 3,310,903
DISMOUNTABLE FISHING ROD
René Georges Binvignat, 41 Ave. de Suffren,
Paris, France
Filed Feb. 17, 1965, Ser. No. 433,392
Claims priority, application France, Feb. 25, 1964,
965,113, Patent 1,409,245
3 Claims. (Cl. 43—18)

It is well known in the fishing-rod art to make the same in several sections susceptible to be assembled one with another. In known makings of fishing-rods made from bamboo, so that to assemble two consecutive sections, one of said sections is submitted to a screw-cutting operation and a tubular element forming a male telescoping element is introduced in the screw-cut part while a sleeve or sheath forming a female telescoping element and having an outside diameter corresponding to that of said male element is placed on the latter.

Such telescoping elements are generally made from brass or another cuprous alloy and they have the drawback of becoming rapidly oxidized, more particularly in the presence of sea water. Besides, said elements constitute along the length of the rod rigid parts which are prejudicious to the resilient or spring characteristics of said rod. Moreover, the screw-cut part made in one of said elements results in a weak point along the length of the fishing-rod.

In the up-to-date makings, more particularly when making casting fishing-rods, there is an increasing trend to make the rods from synthetic materials, more particularly from fiber-glass impregnated with a resin, or from a metal. Such fishing rods have good characteristics which were formerly unknown, more particularly when they are made from a single unitary member, but they are cumbersome and it has been contemplated to make them also in several sections.

Since it has proved practically impossible to contemplate to reduce the diameter of a section made from glass fibers by screw-cutting the same in order to place onto said section a male telescoping element intended to cooperate with the female telescoping element of the successive section, it has been devised, starting from the same continuous tubular frustoconical element, to cut a segment in said continuous tubular element, the length of said cut segment being sufficient to allow the positioning on one of the segments of the tubular element of a tubular end piece forming a male telescoping element susceptible to be introduced into a tubular element having a higher diameter and forming a female telescoping element fastened to the other section of the fishing-rod.

Such an arrangement does not solve the oxidation problems of which the fishermen are well aware and, on the other hand, the two fishing-rod sections, when assembled, exhibit a noticeable break in their own resilient or spring characteristics, which is very prejudicious in some delicate fishings needing a fine hand.

The present invention eliminates these drawbacks in providing a new dismountable fishing-rod.

According to this invention, the fishing-rod comprises at least two sections, which are cut from one and the same continuous element having a generally conical shape, said sections being end abutted and maintained in this position by a sliding sleeve the angle of conicity of which is the same as that of those parts of said both sections to be joined together.

According to another feature of this invention, the screw-cut part machined in the continuous element intended to constitute the fishing-rod is effected obliquely as a chamfer, or in a rafter-like shape or in any other contour of geometrical figures.

Several other features of this invention will be revealed when reading the following description with reference to the accompanying drawings which show illustrative and by no means limitative embodiments of the present invention and in which:

FIGURE 1 shows in elevation a fishing-rod according to this invention.

FIGURE 2 shows in elevation at a larger scale a part of the fishing-rod in FIG. 1, illustrating one of the features of this invention.

FIGURE 3 is an exploded view, partly in elevation and partly in section of said part of the fishing-rod in FIG. 2, whereby to show in detail this embodiment of the invention.

FIGURE 4 is a partial elevation, with broken parts, corresponding to FIG. 3 and showing the fishing-rod in its operative position.

FIGURE 5 is a cross-section at a larger scale, taken along the line V—V in FIG. 4.

FIGURE 6 is a view partly in elevation and partly in section, showing an alternative embodiment of the fishing-rod according to this invention.

FIGURE 7 is a sectional view at a larger scale, showing an additional feature of this invention.

Turning now to the drawings, it can be seen that the fishing-rod shown in FIG. 1 comprises two parts or sections 1 and 2, of which the section 1 is provided with a handle 3 whereby to support a reel 4, while the other section 2 constitutes the tip of the fishing-rod.

A fishing-rod as that shown in FIG. 1 is preferably made from fibers impregnated with a resin, particularly fiber-glass as is presently well known in the fishing-rod manufacture technique, but this invention may as well be worked in the case of fishing-rods made in another fashion, more particularly in the case of metal fishing-rods.

So that the invention may be better understood, there has been shown in FIGS. 2 to 4 how the same is embodied and said figures represent the characteristc part of the fishing-rod while exaggerating the actual conicity thereof.

To embody this invention, there is preferably used a continuous conical tube made from glass fibers impregnated with a resin, said tube being obliquely cut as at 5 whereby to form both segments 1 and 2. Said oblique cut 5 is intended to allow mainly a self-centering of the segments 1 and 2 when they are brought closer together whereby to be assembled, so that when the fishing rod is in its operative position there exists a perfect alignment of the eyelets 6 and 6a which are supported by said sections and are used to act as a passage for the fishing line 7 as it is well known.

The angle α, visible in FIG. 2, defined between the oblique cut 5 and a plane at right angles with the longitudinal axis of the sections 1 and 2, is preferably in the order of 30°, while a wider or smaller angle may be also used.

Although not necessary in all the cases, it is advantageous as shown by FIG. 3 to provide segment 1 with an internal core member 8, made also preferably from fiber-glass resin impregnated, which is engaged within the tube constituting said segment 1.

When such a core is used, particularly to impart more "vim" to segment 1, it is advantageous that said core slightly protrudes beyond the cut part 5, whereby the protruding end of the core constitutes a guiding stud facilitating the positioning of the segment 2 when the latter is to be assembled with segment 1.

As shown also in FIG. 3, segment 2 supports a sleeve or sheath 9, also preferably made from fiber-glass impregnated with resin, said sleeve having an angle of conicity which is the same as that of the tubular element constituting the fishing-rod, whereby the internal wall of sleeve 9 extends parallel to the external wall of segment 2 on which said sleeve is telescopically engaged prior to the positioning of said eyelets 6a.

The length of sleeve 9 is so chosen that the latter has at its narrower end a diameter less than the diameter of that part of section 2 which has the greater diameter, whereby sleeve 9 cannot be lost.

In order to limit the contingent travel of sleeve 9 along section 2, a stop member 10 is placed on the latter, said stop member being constituted, for example, by a small ring which is stuck or fastened by any suitable means.

As most clearly shown in FIG. 4, upon assembling both sections 1 and 2, all that is necessary is to thread or telescope the end of section 2 on the protruding part or stud of the core member 8 to the point when the edges of the cut parts 5 engage in an abutting relationship. Then, the sleeve 9 is slid longitudinally in the direction of arrow $f_1$ so that said sleeve is nested on the end of section 1 and squeezes the latter.

As shown in FIG. 4 as well as in FIG. 5, the internal wall of sleeve 9 has through its whole surface a bearing relationship with the corresponding parts of the walls of sections 1 and 2, since said sleeve 9 has the same conicity as these sections.

In addition, the obliquely cut parts 5 which insure the centering of both sections 1 and 2 have for their additional function to well distribute the forces which are to be transmitted from one section to the other, whereby the fishing-rod thus constitutes an element having a very gradual flexibility, this making possible to use said rod for delicate fishings which need a definite hand.

To dismantle the fishing-rod, even if the sleeve 9 is jammed, all that is necessary is to apply a torsional effort between the sections 1 and 2, because the edges of the cut parts 5 of said sections, respectively, act as a cam member in tending to separate said sections one from the other, this simultaneously liberating the sleeve 9. It is to make such an action particularly easy that it has found advantageous to choose the angle $\alpha$ in the vicinity of 30°.

According to the alternative embodiment of this invention shown in FIG. 6, provision is made for making the handle 3 of the fishing-rod as a hollow element, which is closed, if so desired, by a plug member 11. The parts or segments 1 and 2 of the rod are exactly made as above-described, but the core member 8 is preferably constituted by a tubular element which may be made from the same material as that of the fishing-rod 1, or on the contrary a different material. The core member 8, which is conical and has the same apex angle as sections 1 and 2, is simply forcibly engaged into section 1 by introducing said core member through handle 3, after having removed plug 11. In this manner, it is easy, if so desired, to remove core 8 and replace the same by another one having a total length $l$ which is different from that of the initial core.

Owing to the removability of the core 8, it is possible to adjust three different parameters, viz. the parameter $l$, that is the total length of the core, the parameter $l_1$, i.e. the core section length 1 which lies within the fishing-rod section 1, and the parameter $l_2$, i.e. the length of that core 8 section which lies within the fishing-rod section 2.

The foregoing shows that by a mere substitution of the core 8 for another, the resilient characteristics of the fishing-rod 1 may be modified to a very noticeable degree whereby to adapt the rod to different kinds of fishings.

The arrangement shown in FIG. 7 contributes to the adaptation characteristics of the fishing-rod. In effect, the core member 8, when the same is constituted by a tubular element, may by itself contain internal inserts 8a, which are either tubular or solid, but have also a conical shape, whereby the flexibility of the core 8 may be adapted at different points thereof, which correlatively allows to adapt the resulting flexibility of the fishing-rod.

When the fisherman wishes to remove the core 8 from his fishing-rod, for example to replace said core by another, all that he has to do is to disconnect the section 2, as explained hereinabove, then by gently knocking that end of core 8 which protrudes from section 1, to slide said core within said section, from which it may be easily taken out after having removed plug 11.

In this description, it has been considered that the fishing-rod included only two sections, but is well evident that it may be made from more of these sections if so desired. Also, the cut part between the two sections may be given another configuration than that above-mentioned, particularly it may have a rafter or wedge shape, or a short stud may be provided on one of said sections while a female telescoping part is provided in a complementary fashion in the other section.

Various changes may be brought to this invention without going outside of its scope as defined in the appended claims.

I claim:

1. In a sectional fishing rod comprising axially alignable, progessively-tapered, hollow sections having a circular cross section, said sections including eye elements projecting radially therefrom for receiving a fishing line therethrough, the improvement comprising complimentary, oblique chamfers at adjacent ends of said respective sections for orienting said eye elements in colinear relationship, a frustoconical sleeve circumposed about one of said sections having the smallest cross section, said frustoconical sleeve being axially displaceable on said one section and having a minimum opening at one end less than the maximum terminal diameter of said one section whereby said sleeve cannot be axially removed from said terminal end, an abutment element on said one section at an intermediate portion thereof for retaining said sleeve on said one section, and a tapered core element in said other section, said core element projecting axially beyond said other section, the portion of said core element projecting axially from the terminal end of said other section being axially received in and complementary to the terminal bore portion of said one section, whereby when said sections are rotated about their longitudinal axis with respect to each other, said chamfer ends will cam the sections apart when the said frustoconical sleeve is circumposed about said adjacent ends.

2. The structure as claimed in claim 1 in which said core element is removably received in said sections whereby the core elements may be replaced for altering the bending characteristics of said rod.

3. The method of adjustably varying the flexibility of a hollow fishing rod comprising the steps of:

(a) producing a hollow fishing rod having a progressively-decreasing conical cross section from end to end and open at its larger end;

(b) producing a plurality of frustoconical core elements of varying length and complementary to interior portions along the length of said hollow fishing rod;

(c) selectively inserting at least one of said core elements into said rod from its open end until it reaches a complementary interior cross section in said rod to obtain a desired bending characteristic in said rod; and (d) removing said selected core element from the open end of said rod and substituting a second core element therefor of a different length so that said second core element is complementary to another interior portion of said hollow rod whereby the bending characteristics of said rod are changed.

References Cited by the Examiner

UNITED STATES PATENTS

| | | | |
|---|---|---|---|
| 189,120 | 4/1877 | McClintock | 43—18 |
| 395,931 | 1/1889 | Treadway | 43—18 |
| 692,884 | 2/1902 | Lyon | 43—18 |
| 1,385,149 | 7/1921 | Rawson | 43—18 |
| 2,536,388 | 1/1951 | Murray | 43—18 |
| 2,601,351 | 6/1952 | Wilburn | 43—18 |

FOREIGN PATENTS 387,500   2/1933   Great Britain.

SAMUEL KOREN, *Primary Examiner.*

D. J. LEACH, *Assistant Examiner.*